(12) United States Patent
Sato et al.

(10) Patent No.: US 8,660,785 B2
(45) Date of Patent: Feb. 25, 2014

(54) METHOD AND APPARATUS FOR DIAGNOSING DRIVING OPERATION

(75) Inventors: Yasushi Sato, Tokyo (JP); Hideyuki Tsuchikiri, Tokyo (JP); Mai Fujii, Tokyo (JP); Hiroshi Inoue, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 129 days.

(21) Appl. No.: 13/256,238

(22) PCT Filed: Mar. 9, 2010

(86) PCT No.: PCT/JP2010/001671
§ 371 (c)(1),
(2), (4) Date: Nov. 28, 2011

(87) PCT Pub. No.: WO2010/106760
PCT Pub. Date: Sep. 23, 2010

(65) Prior Publication Data
US 2012/0065874 A1    Mar. 15, 2012

(30) Foreign Application Priority Data
Mar. 19, 2009   (JP) ................................. 2009-068294

(51) Int. Cl.
*G06F 19/00*        (2011.01)
(52) U.S. Cl.
USPC ........................................ 701/123; 73/114.52
(58) Field of Classification Search
USPC ..................... 701/123, 674, 103, 112, 70, 85; 73/114.52
See application file for complete search history.

(56) References Cited

U.S. PATENT DOCUMENTS

| | | | |
|---|---|---|---|
| 2004/0008109 A1 | 1/2004 | Endoh | |
| 2005/0190469 A1 | 9/2005 | Noguchi | |
| 2008/0319605 A1* | 12/2008 | Davis | 701/35 |
| 2009/0281715 A1* | 11/2009 | Paik | 701/123 |

FOREIGN PATENT DOCUMENTS

| | | |
|---|---|---|
| CN | 1661349 A | 8/2005 |
| CN | 101002012 A | 7/2007 |
| JP | 2000-247162 | 9/2000 |
| JP | 2002-362185 A | 12/2002 |
| JP | 2003-042000 | 2/2003 |

(Continued)

OTHER PUBLICATIONS

International Search Report & Written Opinion corresponding to International Application No. PCT/JP2010/001671 dated May 25, 2010.

(Continued)

*Primary Examiner* — Thomas Black
*Assistant Examiner* — Luke Huynh
(74) *Attorney, Agent, or Firm* — Squire Sanders (US) LLP

(57) ABSTRACT

An apparatus is provided for providing users diagnosis on driving operations in the same manner as diagnosing vehicle failures and for presenting evaluation with supporting data so that users may recognize their driving operations. The apparatus reads out driving data for a plurality of driving cycles from an electronic control unit on board the vehicle. The electronic control unit includes a memory for storing driving data representing fuel efficiency condition of the vehicle in accordance with driving operation by a user in each driving cycle of the vehicle. Charts are produced representing fuel efficiency condition for each driving operation by the user for each driving cycle, based on the read out driving data. The charts are output as comparison results for each one of the driving cycles.

6 Claims, 13 Drawing Sheets

(56) References Cited

FOREIGN PATENT DOCUMENTS

| | | |
|---|---|---|
| JP | 2003-328845 | 11/2003 |
| JP | 2003-331380 | 11/2003 |
| JP | 2004-045180 A | 2/2004 |
| JP | 2006-243856 | 9/2006 |
| JP | 2006-344001 | 12/2006 |
| JP | 2007-023830 | 2/2007 |
| JP | 2007-106195 | 4/2007 |
| JP | 2007-122239 | 5/2007 |
| JP | 2007-256158 | 10/2007 |
| JP | 2009-015789 A | 1/2009 |

OTHER PUBLICATIONS

Japanese Office Action application No. 2009-068294 dated Feb. 26, 2013.

Chinese Office Action application No. 201080011893.X dated Apr. 27, 2013.

* cited by examiner

FIG. 7
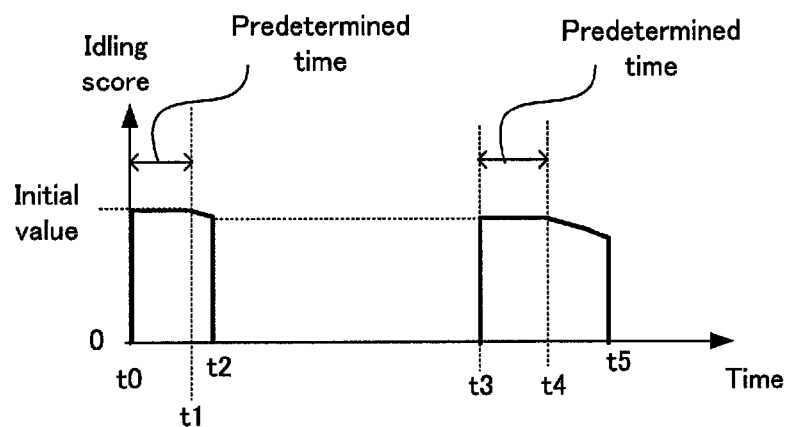
(A)
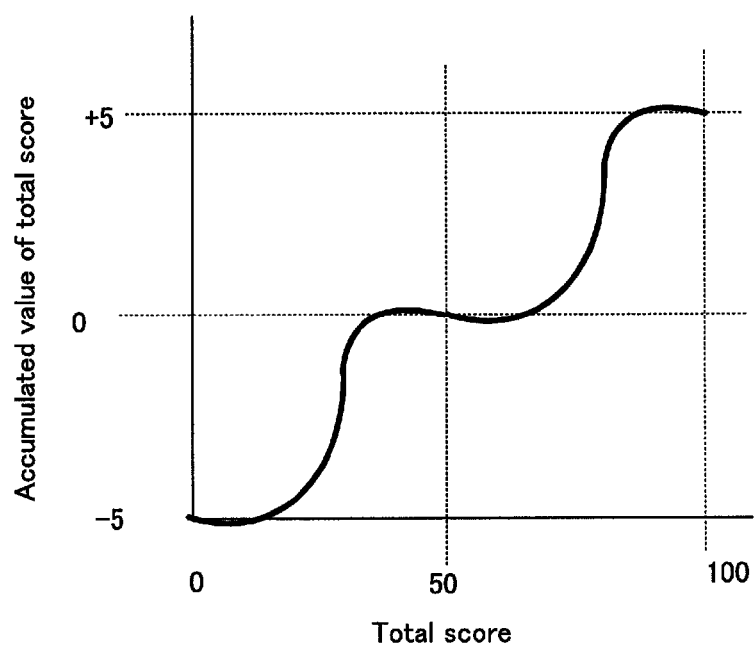
(B)

FIG. 10
(a) 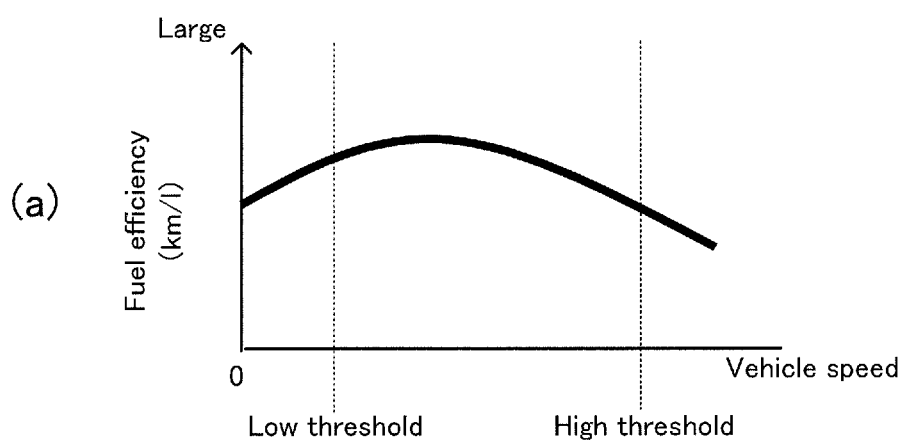
(b) 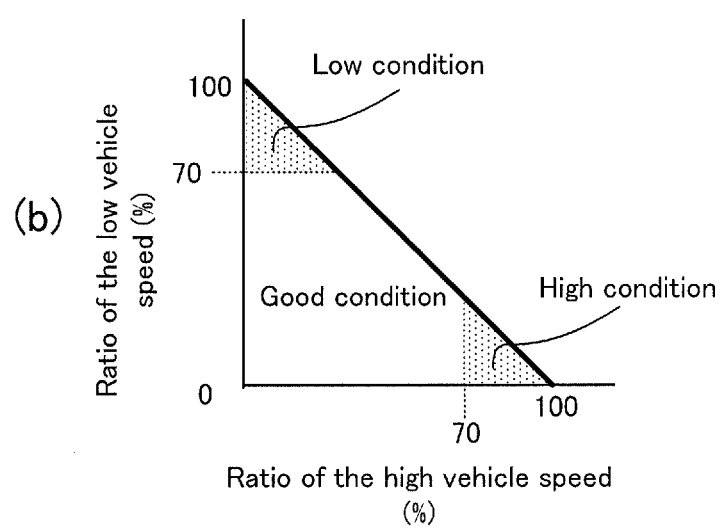

FIG. 11

(a) Accelerator operation

| Range of average accelerator score \ Vehicle speed condition | Good condition | Low condition | High condition |
|---|---|---|---|
| High score range | MA1 | MA4 | MA7 |
| Middle score range | MA2 | MA5 | MA8 |
| Low score range | MA3 | MA6 | MA9 |

(b) Brake operation

| Range of average brake score | |
|---|---|
| High score range | MB1 |
| Middle score range | MB2 |
| Low score range | MB3 |

(c) Idling driving

| Range of average idling score | |
|---|---|
| High score range | MI1 |
| Low score range | MI2 |

FIG. 13

| | ☐ 4 times before | ☐ 3 times before | ☐ 2 times before | ☐ previous time | ☐ this time |
|---|---|---|---|---|---|
| fuel efficiency (km/ℓ) | 21.5 | 20.4 | 19.8 | 14.8 | 12.3 |
| driving distance (km) | 18.6 | 37 | 12.3 | 11.9 | 3.1 |
| Average vehicle speed (km/h) | 67 | 62 | 24 | 23 | 17 |
| Driving fuel efficiency | | | | | |
| medium and low speed (except for idling) — Driving fuel efficiency (km/ℓ) | 21.6 | 18.7 | 21.1 | 16.6 | 14.8 |
| driving distance (km) | 3.9 | 8 | 12.3 | 11.2 | 3.1 |
| high speed (≥72km/h) — Driving fuel efficiency (km/ℓ) | 21.8 | 21.6 | 0 | 14.8 | 0 |
| driving distance (km) | 14.8 | 29 | 0 | 0.8 | 0 |
| driving evaluation | | | | | |
| total evaluation | YYYYY | YYYYY | YYYY- | YYYY- | Y---- |
| Accelerator evaluation | YYYYY | YYYYY | YYYYY | YYYYY | YYYYY |
| Brake evaluation | YYYYY | YYYYY | YYYYY | YYYYY | YYYYY |
| Idling evaluation | YYYYY | YYYYY | ----- | YYYY- | ----- |
| Driving time (minutes) | 14.6 | 30.3 | 23.3 | 17.8 | 6.4 |
| Idling time (minutes) | 1.4 | 1.5 | 3.3 | 6.4 | 2.8 |
| Fuel consumption for idling (cc) | 12 | 40 | 40 | 82 | 42 |
| automatic idling stop time (minutes) | 0.6 | 3.7 | 3.8 | 6.4 | 1.5 |

257 — fuel efficiency row
259 — Driving fuel efficiency section
261 — driving evaluation section

METHOD AND APPARATUS FOR DIAGNOSING DRIVING OPERATION

TECHNICAL FIELD

The present invention relates to a method of diagnosing at a car dealer or a maintenance factory a driving operation of a vehicle for improvement of the fuel efficiency and to a method of ordinary fault diagnosis of a vehicle.

BACKGROUND OF THE INVENTION

Recently, users' concern relating to fuel efficiency (mileage) has risen. People prefer more fuel-efficient driving. Users who purchased vehicles tend to bring complaint and dissatisfaction suspecting malfunction when the fuel efficiency is lower than they expected.

The mileage of a vehicle per unit quantity of the fuel consumption represents the fuel efficiency. The patent literature 1 describes determination between right and wrong by comparing a current mileage with a predetermined target mileage, wherein determined result is informed to the user (driver).

Patent literature 2 discloses a scheme wherein, responsive to a state of fuel efficiency, at least one of intensity and tone for indicating the fuel efficiency is changed. For example, every time the fuel efficiency changes by a predetermined value, the intensity or tone is changed.

Patent literature 3 describes that behavior data of a vehicle is received from a car navigation device, driving attributes (properties) are determined from the behavior data, and distribution of acceleration is statistical processed to perform safety diagnosis. The fuel consumption is obtained from behavior data, and diagnosis is performed with respect to a fuel saving driving. In this method, with the use of a car navigation device, behavior data of the vehicle is transmitted to a driving diagnosis server, so, not only a load on the car navigation device is increased, but also the car navigation device itself needs a design change for use with this system.

DESCRIPTION OF THE PRIOR ART

Patent Literature

Patent Literature 1
Japanese Patent Application Publication No. 2003-42000
Patent Literature 2
Japanese Patent Application Publication No. 2007-256158
Patent Literature 3
Japanese Patent Application Publication No. 2006-243856

SUMMARY OF THE INVENTION

Problems to be Resolved by the Invention

According to existing methods, a driver is informed whether the fuel efficiency is right or wrong, and whether the fuel efficiency is decreasing or increasing by use of the intensity and tone. Information like this is a mere notification about the operation during driving or about a good or bad fuel efficiency under the current situation. No information is provided about driving habits, about what driving operation caused a bad fuel consumption, or about how the driving operation may be improved.

Therefore, for complaint and dissatisfaction for fuel efficiency, diagnosis that can be performed in the same manner as ordinary failure diagnosis at a maintenance factory is desired. A scheme is desired wherein the diagnosis result may be presented to the user together with background data and advice may be given to the driver as to with what driving operation the fuel efficiency may be improved.

Means of Solving the Problem

A diagnosis apparatus of the present invention includes an electronic control unit comprising a non-volatile memory for storing driving data which indicate a state of fuel efficiency of the vehicle responsive to a driving operation in each driving cycle. The apparatus includes means for reading out driving data for multiple driving cycles from the electronic control unit, means for producing a chart showing a state of fuel efficiency for each driving operation by a driver in each driving cycle based on the retrieved driving data, and means for outputting the chart on a display device or a printer as a comparative result for each driving cycle.

According to the invention, for complaint and dissatisfaction for the fuel efficiency, diagnosis may be performed at a maintenance factory in a similar manner to an ordinary fault diagnosis of a vehicle, and the result of the diagnosis, an evaluation of driving operation and advice may be provided to the user along with background data. Thus, the user will recognize what kind of driving should be performed in order to get a better fuel efficiency.

According to one embodiment of the invention, a driving cycle is a driving period from turning the ignition of a vehicle ON to turning it OFF. When at least one of driving speed or driving distance does not reach a predetermined value, or when the engine is not rotating for a certain period after the engine is started, the electronic control unit is designed not to store driving data of this driving cycle in the non-volatile memory.

According to another embodiment of this invention, for each item of driving operation having an effect on a fuel efficiency, driving data includes evaluation scores calculated by an electronic control unit and advice messages to be presented to the user with respect to the state of fuel efficiency. The diagnosis device selects and visually outputs the advice message for the term of driving operation given a low evaluation score from multiple advice messages retrieved from the electronic control unit.

BRIEF DESCRIPTION OF THE DRAWINGS

FIG. 7(A) is a diagram illustrating a method of getting a score according to an idling drive, FIG. 7(B) is a diagram illustrating one embodiment of a map which converts a total score to a value to calculate a life score.

FIG. 10 illustrates relationships between a vehicle speed and a fuel efficiency.

FIG. 11 illustrates one embodiment of advice messages.

FIG. 13 illustrates another embodiment of screen showing the diagnosis result of the driving which is displayed by a diagnosis device.

DETAILED DESCRIPTION OF PREFERRED EMBODIMENTS

Figure 1:
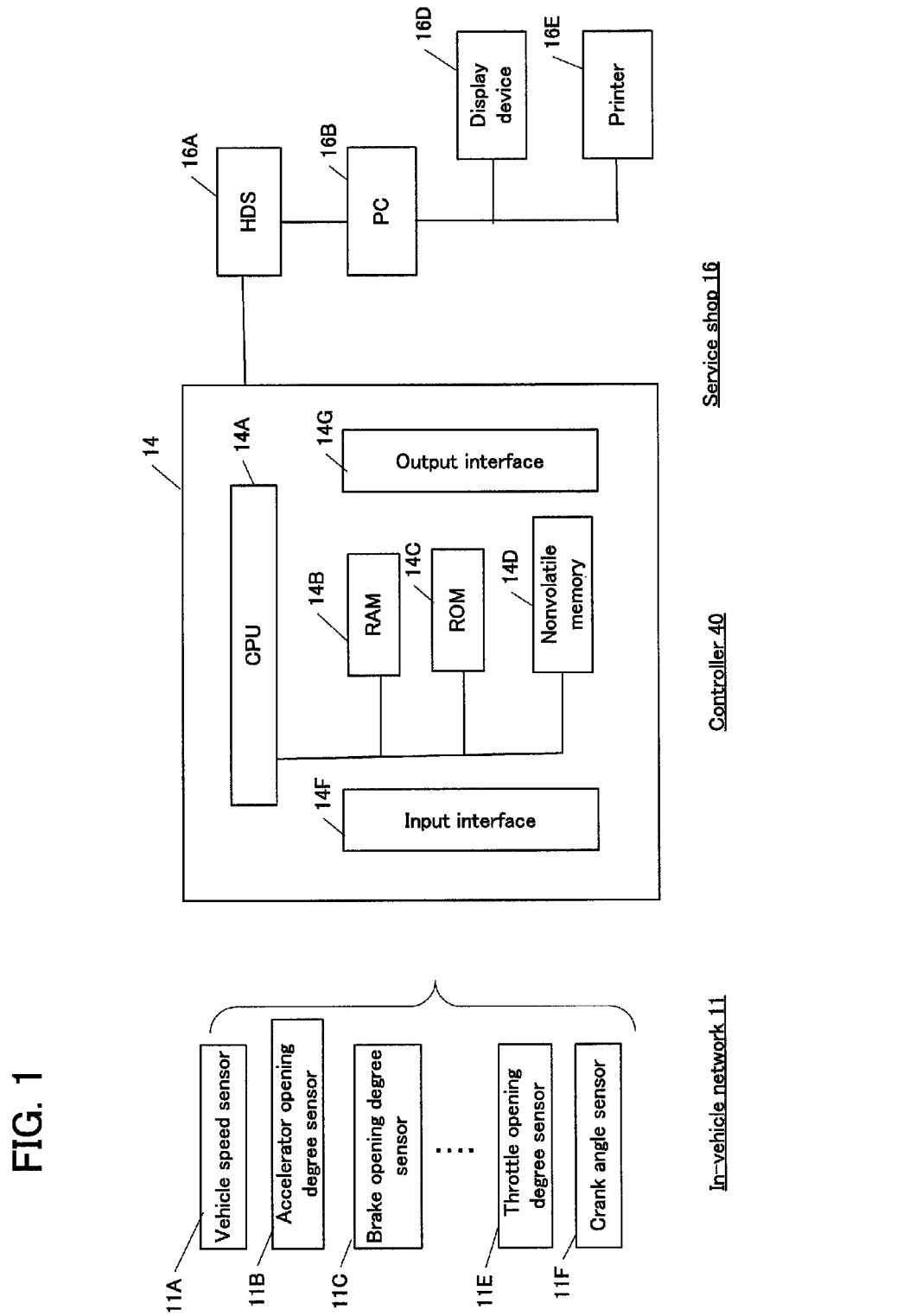
FIG. 1 is a block diagram of a relationship between an in-vehicle system and a diagnosis device at a service shop.

Embodiments of the present invention are described below with reference to the drawings. FIG. 1 is a block diagram showing general relationship between an in-vehicle electronic control unit (ECU) and a diagnosis device of this invention. Electronic control unit 14 is a computer controlling such as fuel injection and an air-fuel ratio of a vehicle. Electronic control unit 14 comprises CPU 14A, and RAM 14B which provides a work area to the CPU and stores a program and data temporarily. ECU 14 also includes ROM 14C which is a read-only memory saving a computer program, rewritable nonvolatile memory 14D which maintains memory even after the power of the vehicle is turned off, input interface 14F, and output interface 14G.

ECU 14 receives output signal through in-vehicle network 11 from sensors mounted on various parts of the vehicle. The sensors include a vehicle speed sensor 11A which detects vehicle speed, an accelerator opening degree sensor 11B which detects degree of pressing on an accelerator, a brake opening degree sensor 11C which detects a degree of pressing on a brake, a throttle opening degree sensor 11E which detects a opening angle of a throttle, and crank angle sensor 11F which is a base for timing of various controls.

Service shop 16 is a dealer shop for providing a maintenance service for vehicles. Service shop 16 is provided with a diagnosis system (HDS) 16A for reading out for diagnosis data from the ECU of a vehicle, the data being stored in the ECU during driving. In service shop 16, in a similar manner as ordinary failure diagnosis, a tablet terminal device of HDS 16A is connected through a data link connector called DLC to ECU14 of a vehicle brought for a diagnosis of fuel efficiency, and data saved in nonvolatile memory 14D is read out. The tablet terminal device of HDS 16A is a tablet mobile terminal developed specifically for the diagnosis system, and is connected to the ECU of the vehicle through DLC for reading out data saved in the ECU. The tablet terminal device of HDS 16A may be coupled to a docking station to connect to a communications network in service station 16, and may be connected to personal computer 16B in service shop 16, which forms the diagnosis device together with HDS. The tablet terminal device of HDS 16A provides read out data from ECU14 to personal computer 16B.

The tablet terminal device of HDS 16A converts the read out data to a xml file. Personal computer 16B edits and processes the data received from HDS 16A by a viewer program, and displays the data on display device 16D such as liquid-crystal display or CRT, or prints out the data by printer 16E.

Personal computer 16B may be a notebook PC, thereby forming a mobile diagnosis device. PC 16B may not be a separate PC. A tablet terminal device may be integrated with functions of personal computer and a monitor (display device) to form a tablet diagnosis device with a function of a monitor.

In addition, HDS 16A can perform a fuel efficiency diagnosis function according to the present invention and an ordinary fault diagnosis function with the same hardware.

Data relating to fuel efficiency, saved in nonvolatile memory 14D of ECU14 and read out by tablet terminal device HDS 16A, include historical data for five driving cycles (D/C) and data at the end of the latest driving cycle. The Examples of data items of the historical data are shown in table 1 for five driving cycles. Every time driving cycle finishes, historical data in the latest driving cycle is saved additionally, and data of the oldest driving cycle (five-cycle old) is erased, thus, data of the past 5 driving cycles including the latest data are saved.

Examples of data saved in each end of the latest driving cycle are shown in table 2. The driving cycle to be saved in a nonvolatile memory is the driving cycle wherein a vehicle is driven over 200 meters after vehicle speed reaches over 8 k/m and engine rotation continues over 3 minutes from the start of the engine. A driving cycle (D/C) that fails to fulfill these conditions may not provide sufficient data from the view point of an evaluation of fuel efficiency, because it is inadequate as a subject for evaluating driving operation. Therefore, when at least one of driving speed or driving distance does not reach a predetermined value or when the engine does not rotate continuously for a predetermined period from starting the engine driving data for this driving cycle as shown in the table 1-2 is not recorded in the non-volatile memory. Thus, only those driving data that are adequate for evaluation are selected and saved for the latest five driving cycles in the non-volatile memory.

TABLE 1

| Item | Unit | Explanation |
|---|---|---|
| Accelerating score | Point | Score of accelerator operation in each (D/C) |
| Braking score | Point | Score of brake operation in each D/C |
| Idling score | Point | Score of idling operation in each D/C |
| Total score of D/C | point | Total score for three operations in each D/C |
| Average speed (1D/C) | km/h | Average speed of vehicle in each D/C |
| Driving time (1D/C) | Second | Driving time of vehicle in each D/C |
| Accelerating message | HEX | Advice message for accelerator operation in each D/C |
| Braking message | HEX | Advice message for brake operation in each D/C |
| Idling message | HEX | Advice message for idling operation in each D/C |
| Fuel consumption for idling | cc | Fuel consumption by idling in each D/C |
| Idling time | second | Not including idling stop time |
| Idling stop time | second | Idling stop time |
| Fuel consumption (City) | cc | Fuel consumption for driving at a speed lower than 72 km/h |
| Fuel consumption (Highway) | cc | Fuel consumption for driving at a high speed of over 72 km/h |
| Driving distance (City) | m | Driving distance for driving at a speed lower than 72 km/h |
| Driving distance (Highway) | m | Driving distance for driving at a high speed of over 72 km/h |

TABLE 2

| Item | Unit | Explanation |
|---|---|---|
| The use of ECON switch | % | Frequency of use of ECON switch |
| Driving time (using ECON switch) | minute | Driving distance for calculating the use of ECON switch |
| Lifetime total score | point | Lifetime score of vehicle |
| ECO class | HEX | Information on ECO class |

Now, the content of each data included in the table 1-2 will be described.

Figure 2:
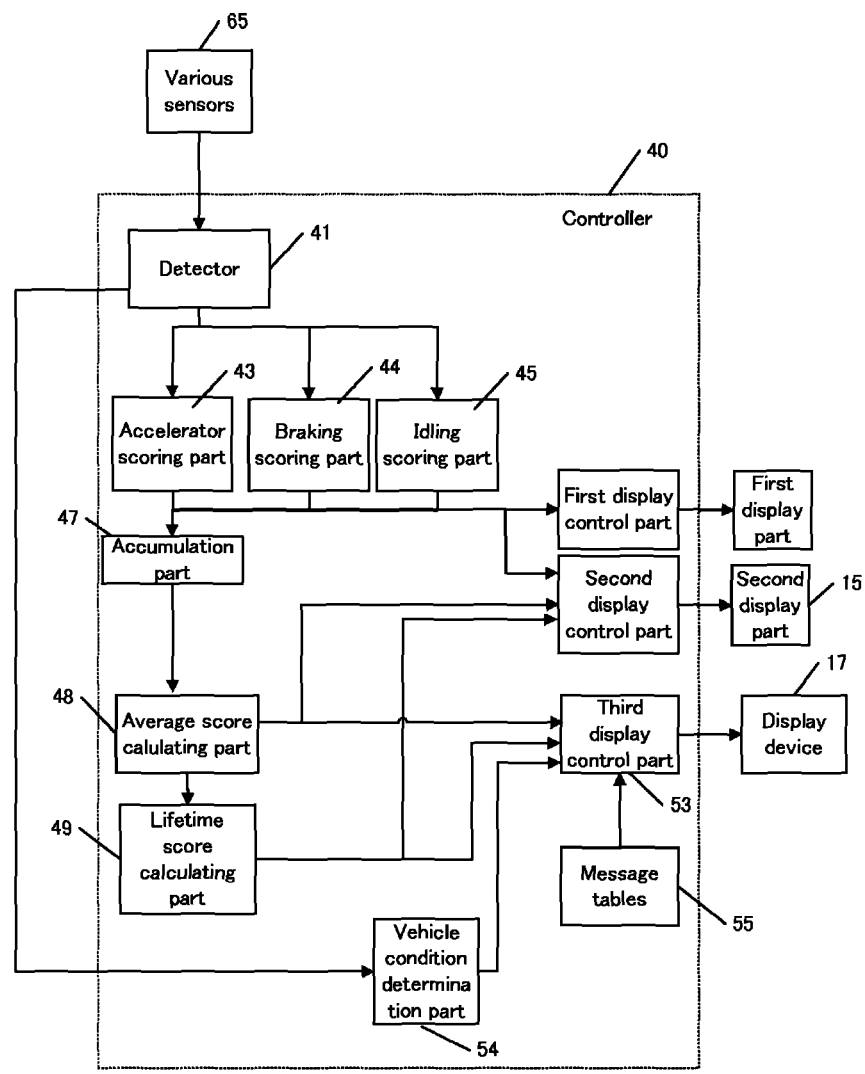
FIG. 2 is a functional block diagram of a control unit 40 of an in-vehicle system.

FIG. 2 is a block diagram of controller 40 installed in a vehicle and generates driving data according to driving operation by a user. Controller 40 includes electronic control unit (ECU) 14 described with reference to FIG. 1.

Driving condition detector 41 detects whether an accelerator operation of a vehicle is performed or not and whether a braking operation of the vehicle is performed or not. Various sensors 65 are installed in vehicle. The examples of sensors are shown in FIG. 1. Driving condition detector 41 detects a diving operation based on output from sensors 65.

When driving condition detector 41 detects that the accelerator operation is accelerator operation is performed, a driving condition of the vehicle corresponding to the accelerator operation is determined based on engine rotation and a throttle opening degree. Engine rotation can be calculated based on crank angle sensor 11F installed in the vehicle. A throttle valve is installed in a suction passage to an engine, an opening angle of the throttle valve is detected by throttle opening degree sensor 11E.

When driving condition detector 41 detects that the braking operation is performed, a driving condition of the vehicle corresponding to the braking operation is determined by a vehicle speed and negative acceleration. The vehicle speed and the acceleration can be detected by vehicle speed sensor 11A installed in the vehicle. An acceleration of a vehicle may be detected by an acceleration sensor installed.

Data of an Accelerating Score

Accelerator scoring unit 43, based on a driving condition according to an accelerator operation, calculates a score for the accelerator operation by evaluating the accelerator operation from the view point of fuel efficiency.

One example of a map preliminarily stored in ROM14C of controller 40 is shown in FIG. 3(a). A horizontal axis of the map shows an engine rotational speed (rpm) and a vertical axis shows throttle opening degree (deg.). Line 111 represented by bold solid line is a line representing, predetermined optimum values of BSFC (Brake Specific Fuel Consumption, an unit is (g/kWh)) called net fuel consumption rate, or a driving condition to realize a value set as a best fuel efficiency. This is preliminarily determined depending on engine characteristics with respect to each engine rotational speed and throttle opening degree. If the throttle opening degree is about 40 deg. as shown by the dot of sign 112 when the engine rotational speed is 3000 rpm, it is shown that the optimum net fuel consumption rate can be achieved.

Figure 3:
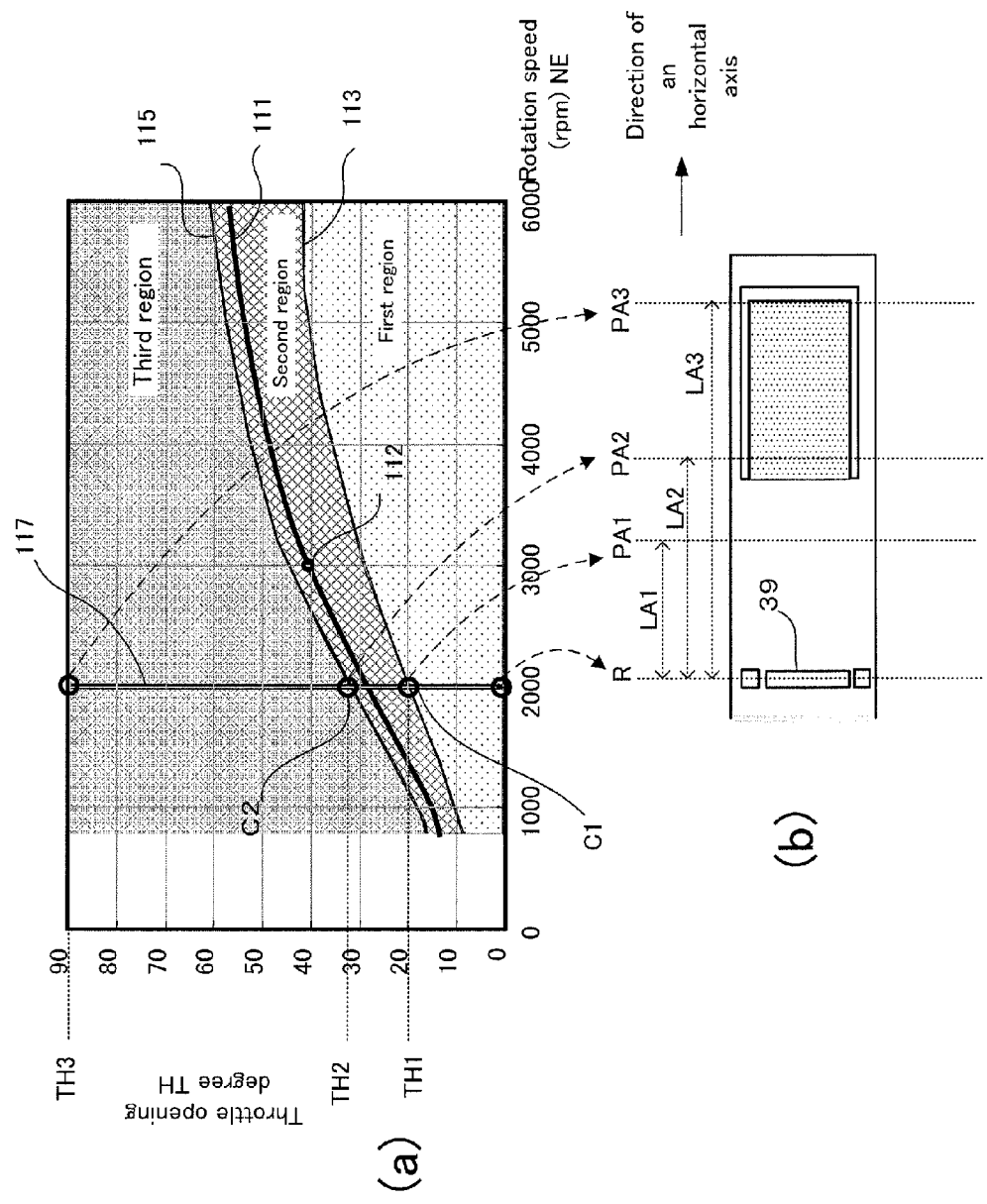
FIG. 3 is a diagram illustrating a method of getting a accelerator score according to accelerator operation.

In FIG. 3, it is not shown that the region wherein the engine rotational speed is less than approximately 800 rpm. This is the region wherein the engine is in the idling condition, and a control in the idling driving condition will be described below.

In FIG. 3, when values of revolutions are the same, the higher the throttle opening degree, the lower the fuel efficiency is. There, in this case, a driving region is divided into three regions in the direction of longitudinal axis to set the three fuel efficiency conditions consisting of a good condition, a non-good condition, and a condition between the good condition and the non-good condition. In particular, it is divided into regions near line 111 of BSFC, the lower region of the region near line 111 of BSFC, and the higher region of the region near line 111 of BSFC, these regions are delimited by lines of 113 and 115. The region lower than line 113 is a first region, the region between line 113 and line 115 is a second region, and the region higher than line 115 is a third region. The first region is the region in which the fuel efficiency is good, the third region is the region in which a fuel efficiency is not good, and the second region is in between them and is set as the region non-reaching to the non-good region.

The third region is equivalent to a driving region wherein an accelerator operation with a rapid acceleration is performed or a vehicle speed is too faster. The second region is equivalent to a driving region wherein an accelerator operation leads to gradual speed-up, and the first region is equivalent to a driving region in which a accelerator operation as executing cruise driving is performed and a vehicle speed is too faster.

Accelerator scoring unit 43 refers to a map based on an engine rotational speed (NE) detected according to an accelerator operation and detected throttle opening degree (TH), determines a length of described bar 39 and background color 33. It is assumed that the detected engine rotational speed NE is 2000 rpm. Line 117 indicating 2000 rpm of revolutions is shown in the direction of a longitudinal axis. The throttle opening degree corresponding to intersection point C1 between line 117 and line 113 is TH1, the throttle opening degree corresponding to intersection point C2 between line 117 and line 115 is TH2, and the maximum value (90 degrees) of throttle opening degree is TH3.

On the other hand, FIG. 3(b) illustrates accelerator region Ar, a position in the direction of a horizontal axis of accelerator region Ar is shown corresponding to a reference position R. An non-hatched region shows the condition of the accelerator operation with a good fuel efficiency, and hatched region shows the condition of the accelerator operation with a non-good fuel efficiency.

In FIG. 3(b), the range from reference position R to first position PA1 corresponds to the first region of map in FIG. 3(a), the range from first position PA1 to second position PA2 corresponds to the second region, and the range from second position PA2 to third position PA3 corresponds to the third region. The distance from the reference position to PA1-PA3 of the first-third positions are shown by LA1, LA2, and LA3, respectively. Accordingly, when the engine rotational speed NE is 2000 rpm, the range from zero to TH1, of the throttle opening degree, are allocated to the range from position R to position PA3, the range from TH1 to TH2, of the throttle opening degree, are allocated to the range from position PA1 to position PA2, the range from TH2 to TH3, of the throttle opening degree, are allocated to the range from position PA2 to position PA3.

Accelerator scoring unit 43 calculates on a pro-rata basis in which region in the map in FIG. 3, a driving operation condition exists, which is represented by a detected engine rotational speed and a throttle opening degree. If it exists in the first region, the length of the bar 39 is calculated by LA1×TH/(TH−0). If it exists in the second region, the length of the bar 39 is calculated by LA1+(LA2−LA1)×(TH−TH1)/(TH2−TH1). If it exists in the third region, the length of the bar 39 is calculated depending by LA2+(LA3−LA2)×(TH−TH2)/(TH3−TH2).

The bar 39 is an index to display an accelerator operation quantity or a braking operation quantity, on second display unit 15, in real time, by expansion and contraction of a length to the right or to the left in the drawings. This display refers to the display in the vehicle, and does not refer to the present invention directly, so a description of a display by bar is omitted.

Figure 4:
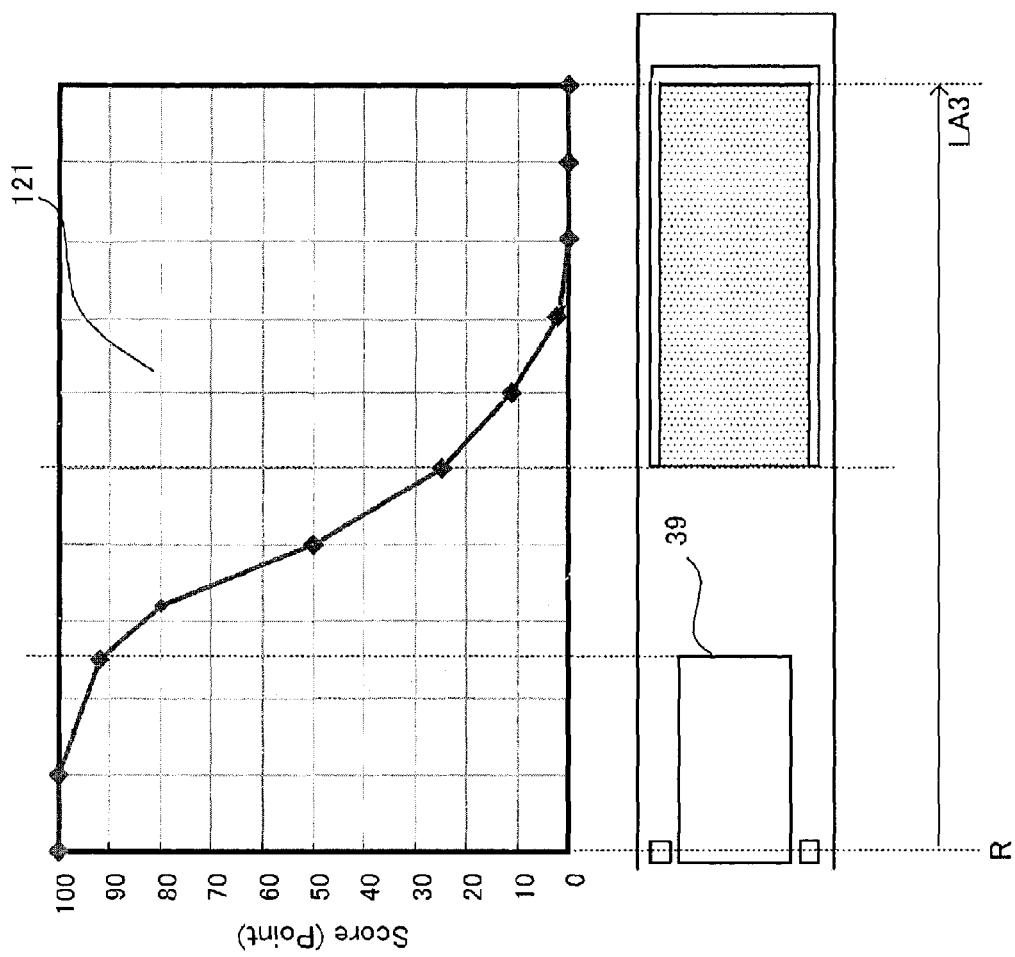
FIG. 4 is a diagram illustrating a method of getting a accelerator score according to accelerator operation.

Accelerator scoring unit 43, further, based on the calculated length of bar 39, refers to map 121 in FIG. 4, and gets a score for the current accelerator operation. The map is stored preliminarily in ROM14C of controller 40. In this embodiment, the scope of a score is from zero to 100 points, the 100 points corresponds to reference position R, and zero point corresponds to the position where is the length of LA3 away from reference position R. In an embodiment in FIG. 4, the score corresponding to the length of the bar 39 is 90 points. As shown in FIG. 4, the shorter the length of bar 39 or the better a fuel efficiency of accelerator operation is performed, the higher score can be gotten.

In this embodiment, the score is shown by an integer. Therefore, when the score corresponding to the length of bar 39 is with a decimal point, for example, the integer can be gotten by rounding.

Thus, during an accelerator operation, a score evaluated form the view point of fuel efficiency is calculated by accelerator scoring unit 43 at specified time intervals. This score is called an accelerator score (accelerating score). During drive cycle of a vehicle, the accelerator score is calculated sequentially at specified time intervals and stored in RAM14B, and used for calculating a total score and an average value of accelerator scores.

Braking Score

Now, braking scoring unit 44 in FIG. 2 will be described. Braking scoring unit 44, based on a detected driving condition according to a braking operation, calculates the score for the braking operation by evaluating the braking operation from the view point of fuel efficiency.

Figure 5:
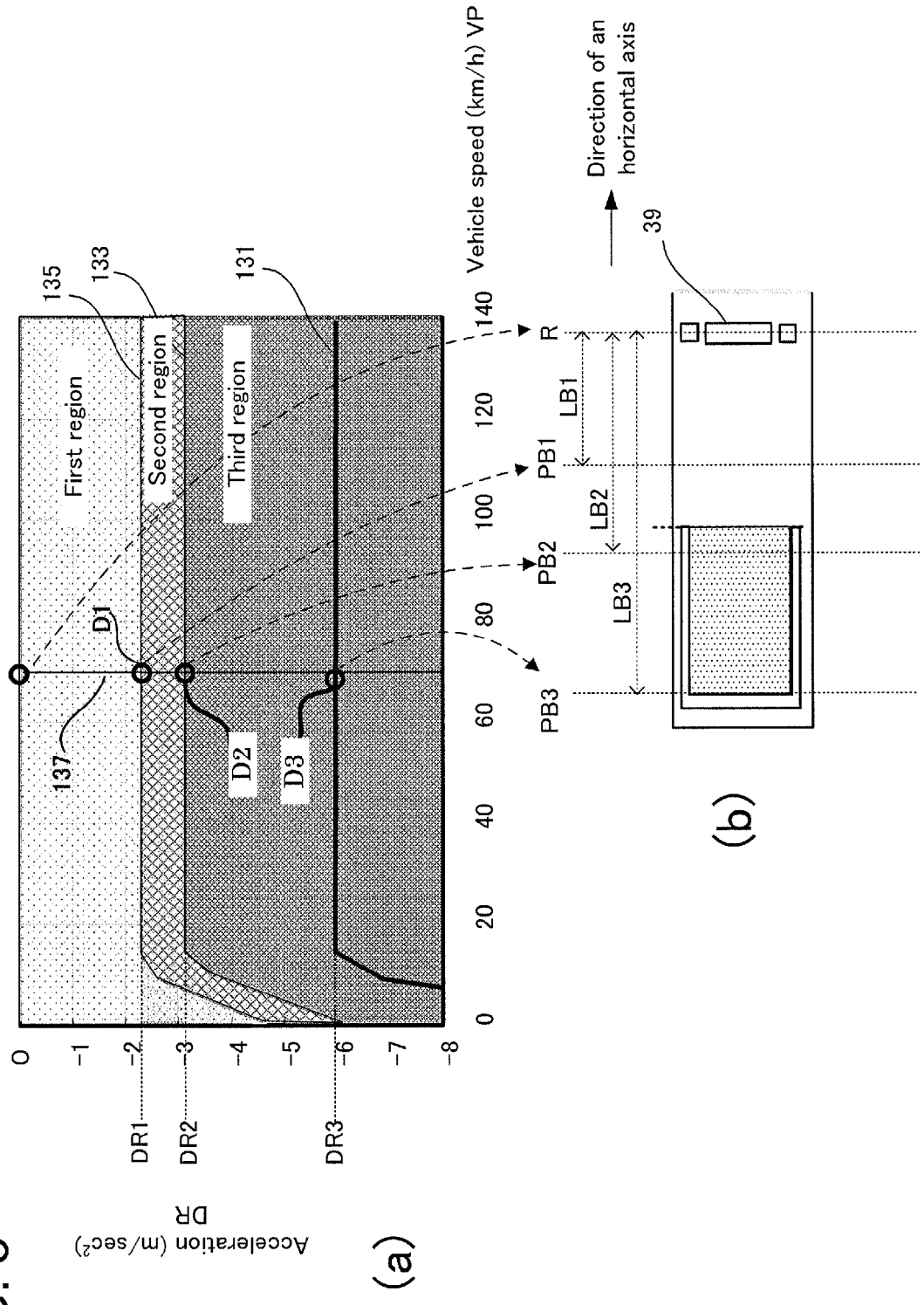
FIG. 5 is a diagram illustrating a method of getting a brake score according to brake operation.

Referring to FIG. 5, one example of a preliminarily stored map in the memory of controller 40 is shown in (a). An horizontal axis of the map shows vehicle speed (km/h), a longitudinal axis shows acceleration (m/sec$^2$). And, the map has negative values because of a deceleration. Line 131 represented by bold solid line are values representing accelerations when a predetermined sudden braking operation is performed, during a usually driving (in this embodiment, vehicle speed is faster than almost 15 km/h). This is determined preliminarily through a simulation or the like. In this embodiment, it is set in –6 m/sec$^2$ but this is one example and it is not limited to this value.

In FIG. 5, when vehicle speeds are the same, the bigger an absolute value of acceleration, the lower a fuel efficiency is. There, in this embodiment, driving region can be divided into three regions in the direction of longitudinal axis to set the three fuel efficiency conditions consisting of a good condition, a non-good condition, and the condition between the good condition and the non-good condition as well as an accelerator operation. Specifically, as a fuel efficiency is not in good condition, a third region including line 131 is set lower than line 133, the third region corresponds to a driving region in which a braking operation leads to a rapid deceleration. And, a first region is set higher than line 135 as the region in which a fuel efficiency is good, and this is equivalent to a driving region in which the braking operation is performed with power that can stop a vehicle if the vehicle keep a safe distance between oneself and the car ahead. A second region is set between line 133 and line 115 as a region in which a fuel efficiency is comparatively good and does not reach to the non-good region. The first region and the second region are, further, if a braking operation is performed in these regions, on low μ road (road in which static friction coefficient μ is low), set as a driving region in which a slipping can be avoided more definite. Thus, the first region and the second region can be thought as the driving region in which a rapid deceleration is not performed and it is a safer driving region. Line 133 and line 135 delimiting the regions from first to three are determined preliminarily through a simulation or the like.

Thus, braking scoring unit 44 refers to the map set preliminarily and stored in the memory on a basis of vehicle speed (VP) and an acceleration (DR) detected, and determines the length of described bar 39.

It is assumed that the detected vehicle speed (VP) is 70 km/h. Line 137 showing vehicle speed of 70 km/h is shown in a longitudinal axis direction. An acceleration corresponding to an intersection point D3 between line 137 and line 131 is DR3, an acceleration corresponding to an intersection point D2 between line 137 and line 133 is DR2, an acceleration corresponding to an intersection point D1 between line 137 and line 135 is DR1.

In FIG. 5(b), a braking region is illustrated, a position of braking region in the horizontal axis direction is illustrated corresponding to a reference position R. A non-hatched region illustrates a condition of the braking operation with a good fuel efficiency, and a hatched region illustrates a condition of the braking operation with a non-good fuel efficiency. First position PB1 is set on a position corresponding to end DR1 of the first region in FIG. 5(a). Second position PB2 is set on a position corresponding to end DR2 of the second region in FIG. 5(a), a position of the left end of hatched region is set on third position PB3. The distances from the reference position to the positions PB1-PB3 of the first-third positions are illustrated by LB1, LB2, and LB3, respectively.

For example, when a detected vehicle speed VP is 70 km/m, the range from zero to DR1, of an acceleration, are allocated to the range from position R to position PB1, the range from DR1 to DR2, of the acceleration, are allocated to the range from position PB1 to position PB2, and the range from DR2 to DR3, of the acceleration, are allocated to the range from position PB2 to position PB3.

Braking scoring unit 44 determines a region of the map where a driving condition indicated by a detected vehicle speed VP and a detected acceleration DR are present. If it is present in the first region, the length of bar 39 is calculated on a pro-rata basis: LB1×|DR|/|DR1|. Here, | | shows an absolute value. And, if acceleration DR is present in second region 39 is calculated by LB1+(LB2−LB1)×(|DR|−|DR1|)/(|DR2|−|DR1|). If acceleration DR is present in the third region, the length of the bar 39 is calculated by LB2+(LB3−LB2)×(|DR|−|DR2|)/(|DR3|−|DR2|).

Figure 6:
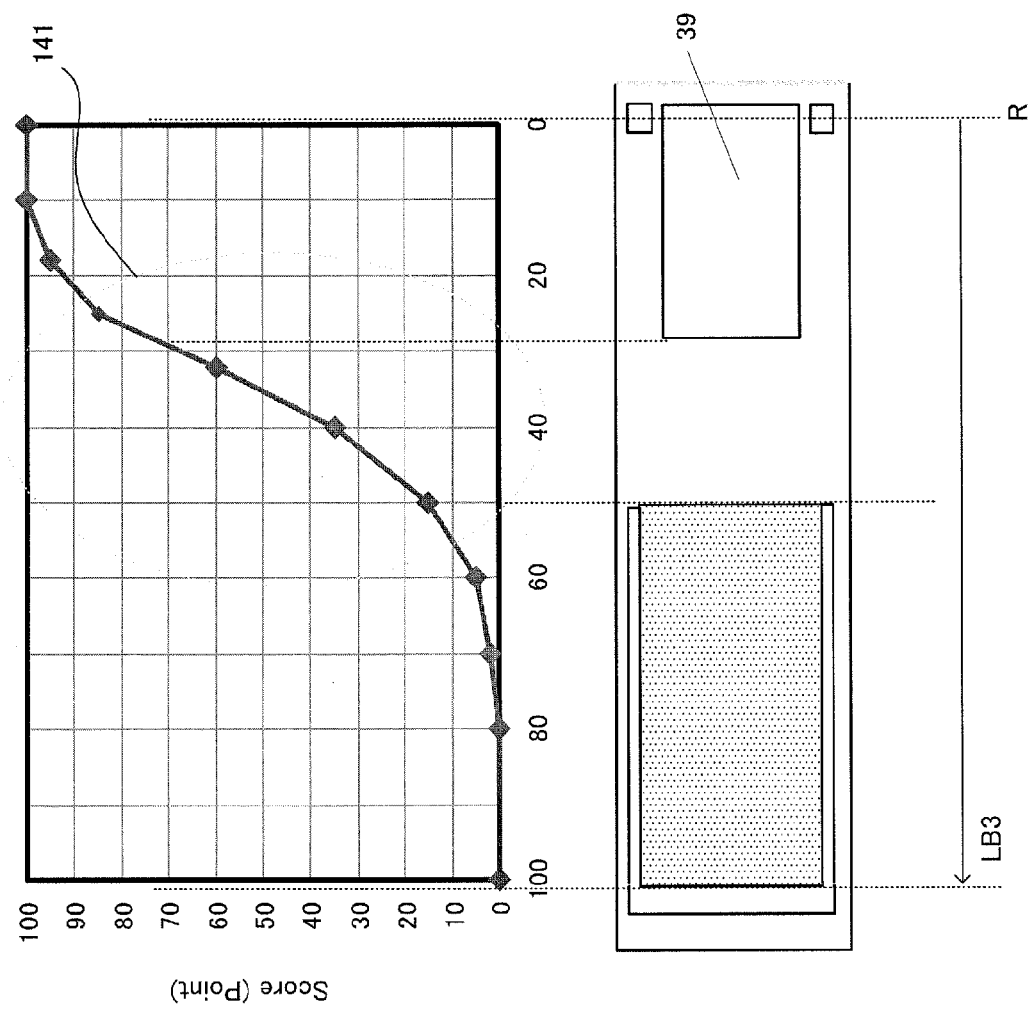
FIG. 6 is a diagram illustrating a method of getting a brake score according to brake operation.

Braking scoring unit 44, further, based on the calculated length of the bar 39, refers to map 141 in FIG. 6, and gets a score for the current braking operation. The map is stored preliminarily in ROM14C of controller 40. In this embodiment, the scope of a score is from zero to 100 points, the 100 points corresponds to reference position R, and zero point corresponds to a position where is the length of LB3 away from reference position R. In an embodiment in FIG. 6, the score corresponding to the length of bar 39 is 70 points. As shown in FIG. 6, the better fuel efficiency of braking operation is performed, the higher score can be gotten.

In this embodiment, the score is shown by an integer. Therefore, when the score corresponding to the length of the bar 39 is with a decimal point, for example, the integer can be gotten by rounding.

Thus, during a braking operation, a score evaluated form the view point of fuel efficiency is calculated by braking scoring unit 44 at specified time intervals. This score is called a braking score (braking score). During drive cycle of vehicle, the braking score is calculated sequentially at specified time intervals and stored in RAM14B, and used for calculating a total score and a average value of braking score.

Idling Score

Back to FIG. 2, idling score calculating unit 41 detects an idling driving condition of a vehicle. When an idling driving is started at the start in one driving cycle, idling driving scoring unit 45 sets an initial value in an idling score. And, idling driving scoring unit 45, each time when idling driving is detected, gets a timer (not shown) started to measure an elapsed time of the idling driving. And, after a predetermined time is past from a starting of the idling driving, the idle score is decreased by a predetermined value at specified time intervals.

Here, referring to FIG. 7(A), a method of decreasing point value of an idling score is described. A driving cycle and an idling drive are started in time t0. An initial value is set in an idle score (100 points in this embodiment). The idle score is decremented by a predetermined value at specified time intervals from time point t1 when a predetermined time (for example, one minute) has been past from the starting of the idling driving, to time point t2 when idling driving is finished. Here, preferably, a predetermined time is set so that it is equivalent to a duration of the idling time needed in a stop of a vehicle or waiting at a traffic light or the like, and can be set based on a simulation and a empirical value. Thus, the idle score can be prevented from decreasing about idling drive having an ordinary duration in a stop of the vehicle or waiting at a traffic light or the like. As the idle driving over a predetermined time, for example, a parking or the like for some sort of business can be thought, so, the longer the duration of an idling time, the lower the value of an idle score is.

The value of an idle score at the time point t2 when the idling drive is finished, for example, is stored and maintained in the memory of controller 40. Again, if an idling drive starts at the time point t3, the value of an idle score (or, the value of an idle score at the time point t2) maintained in the memory of controller 40 is read out at the time point t4 when the predetermined time has been past from the start. And, the idle score is decremented by a predetermined value at specified time intervals until the time point t5 when the idling drive is finished. Thus, during one driving cycle, the idle score is decreased according to the duration of the idle score.

Thus, every time an idling is performed, an idle score evaluated an idle operation from the view point of fuel efficiency is calculated by idle operation unit 45. An idle score is calculated sequentially at specified time intervals and stored in RAM14B during a driving of a vehicle (during a driving cycle), and used for calculating a total score and an average score of an idle score.

A Calculation of an Average Score

Back to FIG. 2, accumulation unit 47 accumulates the accelerator score, the brake score, and the idle score calculated as described above at specified time intervals. The accumulation, in this embodiment, is performed in every one drive cycle from the start of the engine to the stopping of the engine (or from an ignition ON to the ignition OFF).

In average score calculating unit 48, each of the accumulated values of the scores of the described three scores accumulated by accumulation unit 47 is divided depending on an elapsed time of the corresponding operation respectively. And, average score calculating unit 48 sequentially calculates each of average values of the described three scores respectively. At the same time as this, a sum of these three scores is accumulated similarly and is divided depending on an elapsed time, and a total score is calculated sequentially. Thus, average values of the three individual values and a total score which are calculated sequentially depending on an elapsed time, are stored in RAM14B. When a driving cycle is finished by turning OFF an ignition key, the average values of the three individual values and the total score which are stored in RAM14B, are stored in nonvolatile memory 14D as a accelerator score, a brake score, an idle score, and a total score, representing this driving cycle.

Figure 8:
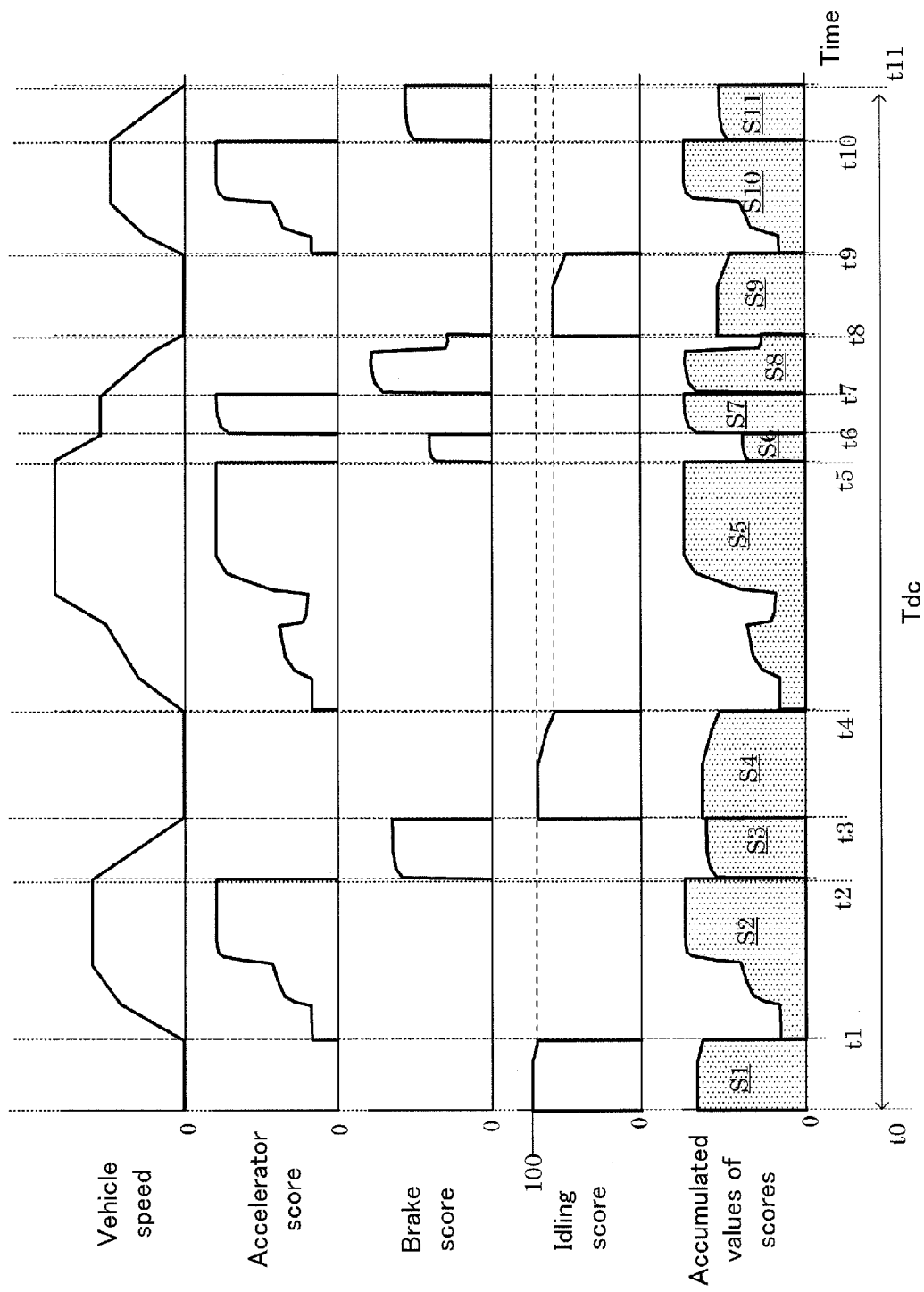
FIG. 8 illustrates one embodiment of an accumulation of each score according to driving operation.

Here, referring to FIG. 8, on time point t0, a driving cycle is started by turning ON an ignition key. An idling drive starts with the start of the driving cycle. An initial value (for example, 100 points) is set in an idle score. The idle score is decremented, according to an elapsed time after a predetermined time has been past after the start of the idling drive, as described referring to FIG. 7(A). The idling drive is finished on time point t1, and, when an accelerator pedal is depressed, a vehicle speed gets higher. During an accelerator operation, an accelerator score is calculated at specified time intervals as described above. On time point t2, the accelerator operation is finished, and a pressing on a brake pedal is started. During a braking operation, a braking score is calculated at specified time intervals. The braking operation is finished on time point t3, a vehicle speed becomes zero, the vehicle stops, and the idling driving is started again. It is started to decrement the idle score from the last count after the predetermined time has been past. On time point t4, the accelerator operation starts again.

On starting time point of a driving cycle t0, an integrated value is zero. The accelerator score, the brake score, the idle score are calculated at each time point from time point t0 to time point t11 when a driving cycle is finished, but every time these scores are calculated, the score is added to the previous score and the integrated value of this time is calculated. The integrated value of the drawing illustrates this integration process in an image. The idle score is accumulated from time point t0 to time point t1, this is shown by an region S1. The accelerator score is accumulated from time point t1 to time point t2, this is shown by an region S2. An accumulation score on time point t2 is S1+S2. The brake score is accumulated from time point t2 to time point t3, this is shown by a region S3. The accumulation score on time point t3 is S1+S2+S3.

Every time the integration process is performed, a total score is calculated by dividing by an elapsed time from the start of the driving cycle t0 to the present time. For example, the total score at time point t2 is calculated by (S1+S2)/(t2−t0).

A total score when one driving cycle is finished is calculated by dividing a total score accumulated by the driving cycle by a length of time Tdc. An embodiment in FIG. 8, it can be calculated by (S1+S2+ . . . +S11)/Tdc. The total score when one driving cycle is finished shows an average fuel condition of this driving cycle. The total score when one driving cycle is finished is stored in nonvolatile memory 14D of the controller 40.

Average score calculation unit 48 calculates average values of three individual values with the same timing with calculating a total score. And that is, an integration score about an accelerator score is calculated, and an average value is calculated by dividing the integration score by an accelerator operation time. For example, when an driving in FIG. 8 is performed, an average of an accelerator scores on a time point t5 is calculated by (S2+S5)/((t2−t1)+(t5−t4)). Similarly, the calculation of a brake operation and an idling operation are performed, and an average brake score and an average idle score are calculated respectively. About an average idle score, it may be calculated by including the described predetermined time referring to in FIG. 7 (for example, in an embodiment in FIG. 8, an average idle score on time point t1 is calculated by S1/t1). And it may be calculated without including the described predetermined time (for example, in an embodiment in FIG. 8, an average idle score on time point t1 is calculated by S1/(t1−predetermined time)). These individual average scores with a total score are stored in RAM14B.

The calculation of an average score can be performed at long time intervals relatively, for example in the background of a calculation for an engine control. It is for reducing a load of ECU.

A Total Score Calculation Flow

Figure 9:
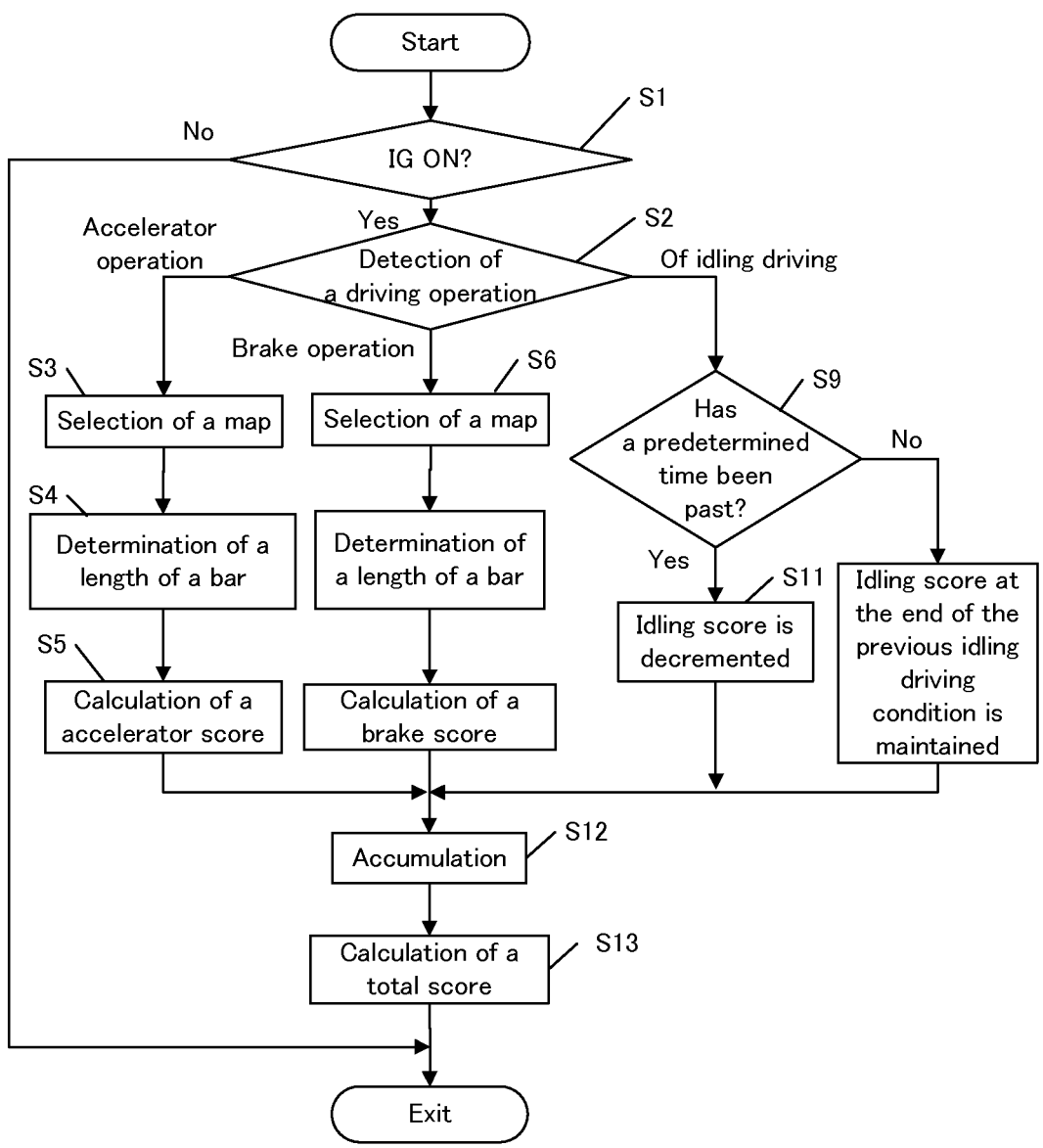
FIG. 9 is a flow chart which illustrates a process to calculate a total score.

FIG. 9 is an embodiment of a flow of a total score calculation process performed by controller 40. The process to being calculated is performed at specified time intervals (for example, 100 milliseconds).

In step S1, if an ignition switch is ON, this process will be performed. In step S2, a condition is detected from an accelerator operation, a brake operation, or an idle operation.

When the accelerator operation is detected, the map in FIG. 3 is selected (S3), a length of a bar is determined referring to this map based on a detected engine rotational speed NE and a detected throttle opening degree TH (S4). Then, an accelerator score is obtained referring to the map in FIG. 6 (S5).

In step S2, when a brake operation is detected, the map in FIG. 5 is selected (S6), a length of a bar is determined referring to this map based on a detected vehicle speed VP and a detected acceleration DR. Then, brake score is obtained referring to the map in FIG. 6 (S5).

In step S2, when the idling operation is detected, it is determined whether a predetermined time has been past or not after the start of the idling driving this time (S9). If it has not been past, in step S10, the value of an idling score at the end of the previous idling driving condition is maintained without change. And, if it has been past, in step S11, the idling score is decremented by a predetermined (subtracted) value. The initial value is set in an idle score at the start of a driving cycle.

In step S12, the accelerator score, the brake score, and the idle score which are calculated this time, are added to the previous integrated value, and an integrated value of this time is obtained. In step S13, the total score is calculated by dividing the integrated value of this time by an elapsed time after the start of the driving cycle.

Thus, the total score is calculated at specified time intervals and displayed for the period of the driving cycle. An average score calculated at the end of the driving cycle is stored as a total score in RAM14B, a lifetime score is calculated based on this total score.

A time interval of calculating an accelerator score or the like and a time interval of calculating a total score may be the same, and one may be longer than the other. For example, one may be 100 milliseconds and the other may be 5 minutes.

A Calculation of a Life Time Score

A total score shows an average fuel efficiency condition during a driving cycle, a lifetime score is an integrated value of the total scores for multiple driving cycles, and shows technological level of driving operation regarding fuel efficiency.

Lifetime score calculating unit 49 in FIG. 2, every time each driving cycle is finished, converts a total score of driving cycle this time to a total score equivalent referring to a map in FIG. 7(B). This map is preliminarily stored in ROM14C of controller 40. If a total score is more than 50 points, a driving operation regarding a fuel efficiency is good, so the total score will be converted to a total score equivalent having a positive value. If a total score is less than 50 points, the driving operation regarding a fuel efficiency can not be said good, so the total score will be converted to a total score equivalent having a negative value.

In this embodiment, in the map, a change of a corresponding total score equivalent is small at zero neighborhood, at 50 points neighborhood, and at 100 points neighborhood of a total score. According to this, a total score can be converted to a total score equivalent reflecting technological level of driving operation regarding a fuel efficiency with more precision. A total score equivalent may be changed linearly corresponding to a change of a total score.

In this embodiment, an absolute value of a maximum value of a total score equivalent (+5 in this embodiment) and an absolute value of a minimum value of a total score equivalent (−5 in this embodiment) are the same, but both may be set to different sizes. For example, an absolute value of a minimum value can be bigger than an absolute value of a maximum value (for example, −10 and +5). A degree of subtraction of a lifetime score is bigger than a degree of addition of a lifetime score, so that it can be a strict evaluation score.

In this embodiment, a total score equivalent is shown by an integer. Accordingly, if a total score equivalent corresponding to a total score is obtained with a decimal point, for example, an integer can be obtained by rounding. When a total score is counted by every ten points, a total score equivalents may be defined in a table according to total scores of 0, 10, 20, . . . 100 points.

Lifetime score calculating unit 49 calculates a corrected value by multiplying the total score equivalent obtained in this way by the mileage of the driving cycle this time. It is shown that the longer a mileage, the more experiential amount a driver has. A corrected value can be a value reflecting experience by multiplying a mileage. The corrected value based on the total score equivalent of the driving cycle this time is calculated by multiplying the total score equivalent obtained in the map in FIG. 7(B) by the mileage (km) of the driving cycle this time.

Preferably, an upper limit should be set on a corrected value based on a total score equivalent calculated in every driving cycle. In this embodiment, 200 points is set as the upper limit of the corrected value.

Lifetime score calculating unit 49 calculates the lifetime score by adding the corrected value calculated in the driving cycle to the previous value of a lifetime score.

An initial value of a lifetime score is zero, and the lifetime score is renewed in every driving cycle. The higher a technological level of driving operation regarding a fuel efficiency, the more a value of lifetime score is. A calculated lifetime score stored is stored in nonvolatile memory 14D.

Advice Messages

Back to FIG. 2, a generating of an advice message by third display control unit 53 is described. In this embodiment, controller 40 calculates fuel efficiency (this is called a instantaneous fuel efficiency) with the same timing with calculating a total score. The total scores are calculated at specified time intervals, so the instantaneous fuel efficiency shows fuel efficiency per the time interval. On the other hand, controller 40 calculates an average fuel efficiency by dividing an integrated value of the instantaneous fuel efficiency from a start of a driving cycle this time to the present time by the time length from the start to the present time. An average fuel efficiency and an average score are stored in pairs in RAM14B of control unit 14B.

Further, controller 40 calculates average values of the above mentioned scores and fuel efficiency (mileage) every five minutes. Specifically, as described with reference to FIG. 9, every five minute intervals, acceleration scores, brake scores, and idle scores are added respectively, and the added values are divided by the time interval of five minute to produce five minute average values of the scores. Here, it should be noted that five minute interval is used as an example and other time intervals may be used. The five minute average values are stored in RAM 14B for example.

From the view point of vehicle speed, the condition of vehicle speed is measured for providing advice to the driver about fuel efficiency. In this embodiment, driving condition detector 41 detects vehicle speed, in each driving cycle, at a predetermined time interval (the same timing as the calculation of accelerator score described above may be OK). A vehicle speed may be detected by using vehicle speed sensor 11A as one of sensors 65 (FIG. 2). Vehicle speed condition determination unit 54 determines the condition of vehicle speed based on a ratio in a certain driving time where a vehicle speed is within a predetermined range.

Here, referring to FIG. 10(a), fuel efficiency, responsive to a vehicle speed, acquired from a simulation or a experiment is indicated. An overly high vehicle speed may decrease the fuel efficiency. A overly low speed may also decrease the fuel efficiency as compared to a moderate vehicle speed. The longer a driving time with overly high vehicle speed or a driving time with overly low vehicle speed are, the worse the fuel efficiency and an average accelerator score are.

The fuel efficiency responsive to accelerator operation, even if the amount of pressing the accelerator pedal is constant, decreases when the vehicle speed is overly high, and when the amount of pressing the accelerator pedal increases abruptly to produce intensive acceleration. When the vehicle is driven with an overly high speed, the driver should preferably be informed of the fact. As shown in FIG. 10(a), driving with an overly low speed tends to decrease the fuel efficiency. Thus, the driver should preferably be informed of this fact so that the fuel efficiency may be improved.

Thus, in this embodiment, a larger time between the driving time at a vehicle speed that is equal to or lower than a low threshold value and the long driving time at a vehicle speed that is equal to or higher than high threshold value is detected. And, an advice is presented to the driver so that such driving is discouraged. According to this, the driver may recognize that the fuel efficiency may decrease due to the vehicle speed.

Every time a vehicle speed is detected, vehicle speed condition determination unit 54 determines whether the detected vehicle speed is equal to or lower than the low threshold value or the detected vehicle speed is equal to or higher than the high threshold value to provide an advice as described above. In order to determine a ratio of the driving time in an overly low speed to the driving time in an overly high speed from the start of one driving cycle to the past time, vehicle speed condition determination unit 54 counts a frequency wherein vehicle speed lower than the lower threshold value is detected and a frequency wherein vehicle speed higher that the higher threshold value is detected. And, the ratio of frequencies (in terms of percentage) of frequency that the vehicle speed is lower than the low threshold value to the frequency of detecting vehicle speed from the start of a driving cycle to the current time, and the ratio of frequencies (in terms of percentage) of frequency that the vehicle speed is higher than the high threshold value are calculated. This calculation may be performed in the same timing as the calculation of total score described above. The former ration is called a low vehicle speed ratio and the latter ratio is called a high vehicle speed ratio. The values of these ratios are stored in RAM14B in association with the total score and stored in nonvolatile memory 14D at the end of the driving cycle.

Vehicle speed condition determination unit 54 refers to the map as shown FIG. 10(b) based on the calculated low speed ratio and high speed ratio, and determines a vehicle condition. This map is stored in ROM14C of controller 40. When a high-speed driving is performed at the speed that is equal to or higher than the higher threshold value in 70 percent of the elapsed time from the start of one driving cycle to the present time, a vehicle speed condition is determined as "high".

When a low-speed driving is performed at the speed that is equal to or lower than the low threshold value in 70 percent of the elapsed time from the start of one driving cycle to the present time, the vehicle speed condition is determined as "low".

FIG. 11 illustrates a configuration of message table 55 stored in ROM14C of controller 40. Message table 55 stores advice messages according to each value of the driving operation scores for each driving operation. The advice message is a message to present an advice the driver from the view point of the fuel efficiency for driving operations.

As to an accelerator operation, as shown in (a), an advice message is stored according to a vehicle speed condition and a value of an average accelerator score. In this embodiment, three ranges are provided for the values of average accelerator scores, a low score rage being from 0 point to 29 points, a middle score rage being from 30 points to 69 points, and a high score rage being from 70 points to 100 points. There are three vehicle conditions of "good", "low", and "high" in each of the rages. Accordingly, there are at least nine kinds of messages shown by MA1-MA9 as advice messages stored preliminarily.

As to the brake operation, as shown in FIG. 11(b), advice messages are stored for the values of average brake scores. There are a low score rage, a middle score rage, and a high score rage according to the values of average brake scores. Accordingly, there are at least three kinds of messages shown by MB1-MB3 as advice messages stored preliminarily.

As to the idling operation, as shown in FIG. 11(c), advice messages are stored for the values of average idle scores. In this embodiment, there are a low score rage from 0 point to 49 points and a high score rage from 50 points to 100 points. Accordingly, there are at least two messages shown by M11 and M12 as advice messages stored preliminarily.

Third display control unit 53 displays an advice for a driving operation and information such as scores described above on display device 17 of the navigation apparatus for the vehicle having a navigation apparatus.

Other Data

Controller 40 calculates for the following items in addition to data described above, and stores them in nonvolatile memory 14D at the end of a driving cycle. Nonvolatile memory 14D stores these data described above and the following data of 1) and 2) for the latest five driving cycles. Or, if it exceeds five driving cycles, nonvolatile memory 14D stores these data in a manner of FIFO (first-in-first-out) and deletes old data.

1) Fuel Consumption and Driving Distance in Urban Area.

Fuel consumption (cc) and driving distance (m) are provided when a vehicle is driven at the speed that is not greater than 72 km/h. When vehicle speed sensor 11A indicates 72 km/h, ECU14 calculates an amount of fuel consumption from a total time when ECU14 activates an injector (a fuel injector). At the same time, a total of the driving distance at the speed that is equal to or lower than 72 km/h is calculated. A value calculated sequentially is stored in RAM14B, and a value at the end of a driving cycle is stored in nonvolatile memory 14D.

2) Fuel Consumption and Driving Distance in Highway.

Fuel consumption (cc) and driving distance (m) when the vehicle is driven at a speed higher than 72 km/h. They are calculated by the calculation similar to calculations of the fuel consumption and driving data of 1). A value calculated sequentially is stored in RAM14B, and a value at the end of a driving cycle is stored in nonvolatile memory 14D. Threshold value of 72 km/h is used expediently to distinguish a high speed driving from a medium and low speed driving.

3) ECON Switch

Frequency of use of ECON switch 15A, a switch for selecting an eco-drive mode provided in a driver's seat, and a driving time of one driving cycle are stored in nonvolatile memory 14D, overwriting at the endo of driving cycle to update data. Accordingly, only the latest data is provided to a diagnosis device.

In the ECO drive mode, idling stop time is extended, an air conditioner is controlled for an energy saving, power and rotation of the engine are suppressed, and vehicle control is performed giving priority to the fuel efficiency.

4) Lifetime Score of the Vehicle

A lifetime score described above is stored in nonvolatile memory 14D.

5) An Eco Class of a Vehicle

The stage of lifetime score is made an eco class of the vehicle.

Now, referring back to FIG. 1, a diagnosis with the use of driving data stored as described above is described. When a vehicle is brought in a service shop 16 for diagnosis, a service representative brings a tablet terminal device to a vehicle. The service representative connects a data link connector (DLC) to ECU14 of the vehicle to read data stored in nonvolatile memory 14D into a memory of the tablet terminal device. The data is supplied to a personal computer 16B that is connected. Data to be read for diagnosis of a driving operation by the user are those data shown in table 1 and table 2 described above.

HDS includes a function to diagnose a malfunction of a vehicle, and performs an ordinary fault diagnosis by reading data needed for diagnosing the malfunction of the vehicle when there is a problem in the vehicle.

Personal computer 16B in service shop 16 communicates with a personal computer of a user via the Internet connection. It is possible that the results of evaluation of a driving operation be presented to a personal computer of a user for browsing.

Figure 12:
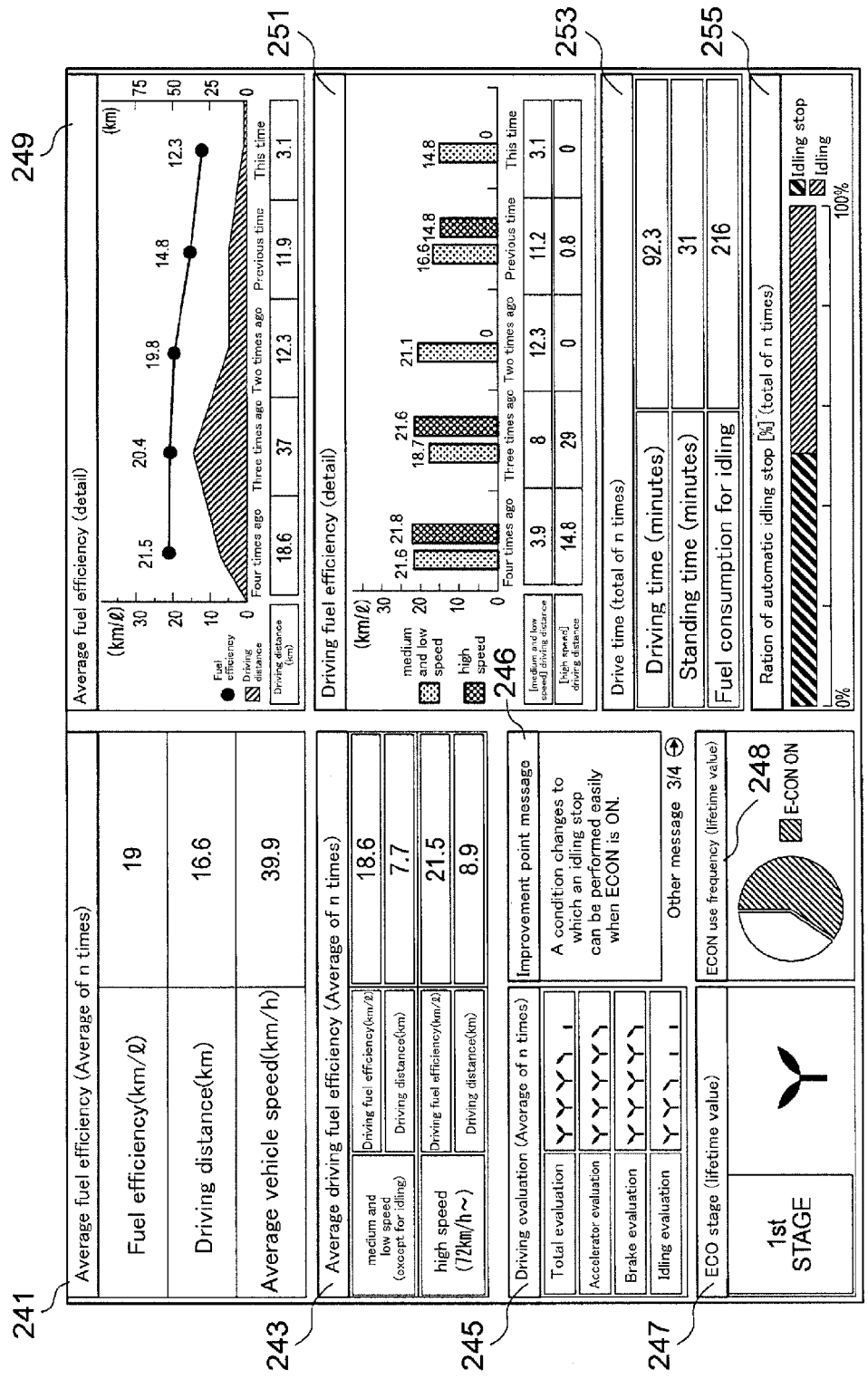
FIG. 12 illustrates one embodiment of screen showing the diagnosis result of the driving which is displayed by a diagnosis device.

There is a computer program installed in personal computer 16B wherein, the computer program compiles data of a driving operation for display on display device 16D such as LCD, or outputs to printer 16E. FIG. 12 and FIG. 13 illustrate one embodiment of charts compiled and presented on the screen of display device 16D.

Section 241 of FIG. 12 indicates a fuel efficiency (km/l) where an average fuel efficiency for n (an integer of n≤5) driving cycles is indicated in terms of driving distance per a liter of fuel. It also shows driving distance, and a average vehicle speed. Section 243 shows an average fuel consumption (km/l) and driving distance when the vehicle is driven at the speed that is equal to or lower than 72 km/h for n driving cycles. It also shows an average fuel consumption (km/l) and driving distance when the speed is equal to or higher than 72 km/h.

Section 245 presents respective average values for n driving cycles for the total score, accelerator scores, brake scores, and idling scores. Scores are illustrated by the number of leafs. Section 246 next to section 245 presents a message on the points to be improved having the highest appearance frequency in evaluations of n driving cycles.

In this embodiment, among accelerator message ID, brake message ID, and idle message ID output from ECU, message having message ID having the highest appearance frequency for n driving cycles (an integer n is not greater than 5) is shown. When the appearance frequencies are equal, "bad message" is displayed preferentially in the order of accelerator, brake, and idling. In the embodiment of FIG. 11, the message of "Turn ECON ON and idle stop may take place frequently" is shown.

Thus, by displaying a message of low score preferentially, an advice about a bad driving operation is displayed so that the driver may become aware of driving habits and an improvement.

But, in this embodiment, for example, a message for a low score that took place only once is not be displayed. A message having high appearance frequency is displayed preferentially. And, when the ratios of the appearance frequencies are equal, operation unit having a significant influence to the fuel efficiency is given priority and a message of a low score is displayed in the case of the same operation part. Thus, it is set to keep away from a nitpicky advice display for a driver who drives well.

In section 247, for an eco stage, a life time score is divided into three stages according to scores and a degree of proficiency of driving operation for fuel efficiency saving is displayed by illustration of one or more leaves. Section 248 next to section 247 is illustrated by a circular graph showing a use frequency of an eco mode, which may be used by pushing ECO switch 15A.

Section 249 illustrates a line chart where the fuel efficiency in each driving cycle changes for n driving cycles. At the same time, the driving distances in each driving cycle are illustrated by a color fill (hatching in the drawing). A vertical axis on the left side indicates the fuel efficiency and a vertical axis on the right side indicates the driving distances.

A graph included in section 251 illustrates data in more detail for the fuel efficiency and the vehicle speed illustrated in section 243. Bar graph with a pale hatching illustrates the fuel efficiency in each driving cycle when the vehicle is driven at a medium and low speed. Bar graph with a dark hatching illustrates the fuel efficiency in each driving cycle when the vehicle is driven at a high speed.

Section 253 illustrates a driving time of the total in n driving cycles, a total idling time, and an amount of fuel consumption by a total idling. Section 255 illustrates a bar graph where the ratio of the usage of an idling stop is illustrated about a vehicle having automatic idling stop function.

FIG. 13 is a chart that illustrates specific numbers of details of the data of FIG. 12. A chart of FIG. 16 is displayed when a user selects it on a personal computer. Section 257 illustrates the data of section 249 of FIG. 12. Section 259 illustrates the data of section 251 of FIG. 12 by specific numbers. Section 261 displays the data of section 245 and section 253 of FIG. 12 where the data are broken down in details to compare on display in each driving cycle.

The charts of FIGS. 12 and 13 displayed on a diagnosis screen presents representation of the relationship between the driving operation and the fuel efficiency in each driving cycle of the latest several times (5 times at maximum) so that the user may recognize an incognizant driving habits and tendency in terms of data, and may recognize what to do to achieve better fuel efficiency.

In a service shop, a diagnosis for confirming no failures may be performed to a customer who visits for diagnosis relative to fuel efficiency. And, a serviceman my give a persuasive advice relative to incognizant driving habits and tendency in driving operation and may give guidance for improvement, by presenting comparative data on driving condition for driving operations.

As an evaluation for the driving operation may displayed or printed as data, the customer may perceive growth as data record each time the customer get a diagnosis. Thus, the customer is inspired for aspiring for a good driving operation as through it were a game.

While a specific embodiment of this invention has been described above, the scope of the present invention is not limited to the embodiments described herein.

The invention claimed is:

1. An apparatus provided outside of vehicles for evaluating driving operations, comprising a computer configured to:
    read out driving data for a plurality of driving cycles from an electronic control unit on board a vehicle, the electronic control unit including a nonvolatile memory configured to store driving data representing fuel efficiency condition of the vehicle in accordance with driving operation by a user in those driving cycles other than driving cycles wherein at least one of vehicle speed and travel distance in a driving cycle does not reach a predetermined value, and other than driving cycles wherein the engine is not activated for a period longer than a predetermined period after the engine is started, the driving cycle comprising the period from turning on of the ignition to turning off of the ignition;
    produce charts presenting fuel efficiency condition for each driving operation by the user for each driving cycle, based on the read out driving data, said charts visually and comparatively presenting said fuel efficiency condition in temporal sequence; and
    output the charts as comparison results for each one of the driving cycles.

2. An apparatus according to claim 1,
    wherein said driving cycle is a period from turning on of the ignition of the vehicle to turning off of the ignition of the vehicle; and
    wherein when at least one of driving speed and driving distance does not reach respective predetermined values, or when the engine of the vehicle is not rotating after a predetermined time has passed since start of the engine, said electronic control unit is configured to prohibit recording of the driving data of this driving cycle into the nonvolatile memory.

3. An apparatus according to claim 2,
    wherein the driving data includes evaluation score that the electronic control unit calculates for each driving operation item having influence on fuel efficiency, and advice messages to present to the user in relation to the fuel efficiency; and
    wherein the apparatus is configured to visually output, out of the plurality of advice messages, one or more advice messages corresponding to the driving operation items that are given low evaluation scores.

4. A method of evaluating driving operations, comprising:
    reading out driving data for a plurality of driving cycles from an electronic control unit on board a vehicle, the electronic control unit including a nonvolatile memory for storing driving data representing fuel efficiency condition of the vehicle in accordance with driving operation by a user in those driving cycles other than driving cycles wherein at least one of vehicle speed and travel distance in a driving cycle does not reach a predetermined value, and other than driving cycles wherein the engine is not activated for a period longer than a predetermined period after the engine is started, the driving cycle comprising the period from turning on of the ignition to turning off of the ignition;
    producing charts representing fuel efficiency condition for each driving operation by the user for each driving cycle, based on the read out driving data, said charts visually and comparatively presenting said fuel efficiency condition in temporal sequence; and
    outputting the charts as comparison results for each one of the driving cycles.

5. A method according to claim 4:
    wherein said driving cycle is a period from turning on of the ignition of the vehicle to turning off of the ignition of the vehicle;
    said method further comprising,
    when at least one of driving speed and driving distance does not reach respective predetermined values, or when the engine of the vehicle is not rotating after a predetermined time has passed since start of the engine, prohibiting recording of the driving data of this driving cycle into the nonvolatile memory.

6. A method according to claim 5:
    wherein the driving data includes evaluation score that the electronic control unit calculates for each driving operation item having influence on fuel efficiency, and advice messages to present to the user in relation to the fuel efficiency; and
    said method further comprising,
    out of the plurality of advice messages, visually outputting one or more advice messages corresponding to the driving operation items that are given low evaluation scores.

* * * * *